United States Patent
Kamimura (12)

(10) Patent No.: US 6,559,963 B1
(45) Date of Patent: May 6, 2003

(54) IMAGE PRINTING APPARATUS HAVING A CAMERA MOUNTABLE THERETO

(75) Inventor: Toru Kamimura, Shiga (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/136,759

(22) Filed: Aug. 19, 1998

(30) Foreign Application Priority Data

Aug. 20, 1997 (JP) .............................................. 9-223838

(51) Int. Cl.[7] .............................................. G06F 15/00
(52) U.S. Cl. .................................................. 358/1.15
(58) Field of Search ........................... 358/1.1, 1.6, 1.9, 358/1.13, 1.15, 302, 296; 347/2, 197; 399/2, 16, 38; 396/429, 544

(56) References Cited

U.S. PATENT DOCUMENTS

| | | | | | |
|---|---|---|---|---|---|
| 4,937,676 A | * | 6/1990 | Finelli et al. | ................ | 358/229 |
| 5,606,420 A | * | 2/1997 | Maeda et al. | ................ | 358/296 |
| 5,757,388 A | * | 5/1998 | Stephenson | ..................... | 347/2 |
| 5,802,413 A | * | 9/1998 | Stephenson | .................. | 396/429 |
| 5,875,034 A | * | 2/1999 | Shintani et al. | .............. | 358/296 |
| 5,903,700 A | * | 5/1999 | Fukushima | ................... | 386/46 |
| 6,000,864 A | * | 12/1999 | Hanada | ......................... | 400/62 |
| 6,104,886 A | * | 8/2000 | Suzuki et al. | ................ | 396/429 |
| 6,111,605 A | * | 8/2000 | Suzuki | ......................... | 348/220 |
| 6,115,137 A | * | 8/2000 | Ozawa et al. | ................. | 358/1.6 |

* cited by examiner

Primary Examiner—Gabriel Garcia
(74) Attorney, Agent, or Firm—Arent Fox Kintner Plotkin & Kahn (57) ABSTRACT

An image printing apparatus includes a digital camera for taking a picture image and a main body for printing the image. The digital camera supplies a photographic image signal to the main body. The main body takes one screen of a still image signal out of the image signal supplied. The still image signal thus taken out is returned to the digital camera where it is delivered to a built-in monitor. The monitor displays thereon a still image corresponding to the delivered still image signal. Thereafter, if a print button is manipulated, a still image being displayed on the monitor is then printed by a printer provided on the main body.

15 Claims, 11 Drawing Sheets

IMAGE PRINTING APPARATUS HAVING A CAMERA MOUNTABLE THERETO

BACKGROUND OF THE INVENTION

1. Field of the Invention

This invention relates to image printing apparatuses, and more particularly to an image printing apparatus for printing images with signals inputted from the outside.

2. Description of the Prior Art

The conventional image printing apparatuses of this kind are disclosed as examples in Japanese Patent Laying-open No. H6-121338 [H04N9/79, G06F15/68, H04N1/40, H04N1/46] laid open on Apr. 28, 1994 and Japanese Patent Laying-open No. H6-344604 [B41J5/30, H04N5/76, H04N5/91] laid open on Dec. 20, 1994. These prior arts are adapted to print still images on one screen basis by inputting image signals from outside.

In any of the prior arts, however, there has been a requirement to prepare a monitor such as a CRT, where confirming images to be printed. In usual cases, a television receiver is employed as a monitor. Accordingly, confirming a certain printing image requires to bring an image printing apparatus to a location close to a television receiver, thus consuming labor for printing.

Meanwhile, when connecting an image printing apparatus to a digital camera in order to print a photographic image taken by the camera, both the digital camera and the image printing apparatus have to be manipulated. This makes the operation uneasy to perform and further there is a fear of unsuccessful printing due to erroneous manipulation of a digital camera during printing.

SUMMARY OF THE INVENTION

Therefore, it is a primary object of this invention to provide an image printing apparatus with which an image to be printed is easy to confirm.

It is another object of this invention to provide an image printing apparatus which can print desirable images regardless of erroneous manipulations.

This invention is an image printing apparatus having a main body for printing an image and a camera to be mounted on the main body, the camera comprising: a signal supply means for supplying a photographic image signal to the main body; and a monitor for displaying thereon an image corresponding to the image signal inputted from the main body; and the main body comprising: a takeout means for taking a desired image signal out of the photographic image signal; a first output means for outputting the desired image signal to the camera; and a print means for printing in accordance with the desired image signal.

In this invention, the camera is mounted on the main body. The signal supply means on the camera supplies a photographic image signal to the main body. In the main body, the takeout means takes a desired image signal out of the photographic image signal. The desired image signal thus taken out is outputted by the first output means to the camera, and printed by the printer. The desired image signal outputted to the camera is delivered to the monitor, with a result that a corresponding image is displayed on the monitor.

Incidentally, the photographic image signal is a real time image signal due to photographing or an image signal reproduced from a recording medium. In one aspect of this invention, the desired image signal is written into a memory by a writing means, and thereafter read out of the memory by a read-out means. The desired image signal thus read out is outputted to the camera. Also, when supplied with a print instruction from a print instructing means, a printing means print in accordance with the desired image signal read out of the memory.

In another aspect of this invention, the photographic image signal supplied from the camera is outputted as it is on the camera by a second output means. An output selecting means is controlled based on a takeout instruction, and selects either one of a first output means or second output means.

In one embodiment of this invention, if an operation instruction is outputted from an operation instructing means, an operation control means controls camera operation in response to this instruction. The operation instructing means is disabled based on the takeout instruction by a first disabling means, and enabled by an enabling means after ending the printing in accordance with the desired image signal.

The main body is provided with an externally inputting terminal through which another image signal is inputted. An input determining means determines on presence or absence of an input through the externally inputting terminal. The photographic image signal and the input image signal through the externally inputting terminal are supplied to a signal selecting means where one of the photographic image signal and the input image signal is selected depending on an input determining result by the input determining means. The takeout means takes the desired image signal out of an output of the signal selecting means.

In the camera, when the input determination result represents a presence of an input, a second disabling means disable the operation control means. Also, if there is an image displayed in a mirror image state on the display, the mirror image representation is canceled based on the input determining result representative of takeout instruction or a presence of an input.

In another aspect of this invention, a first connection determining means determines on presence or absence of connection between the camera and the main body. A direct-current power supply, for generating a first direct-current, is rendered ineffective depending on a first determining result by the first determining means. In the main body, on the other hand, a second connection determining means determines on presence or absence of connection between the main body and the camera. A direct-current voltage creating means creates a second direct-current voltage from a commercial alternating-current voltage, and the created second direct-current voltage is supplied to the camera depending on a second determining result by the second determining means. A voltage creating means creates a drive voltage to the camera based on the first or second direct-current voltage.

According to this invention, since the desired image signal taken out of the photographic image signal is supplied to the monitor, the image to be printed can be readily confirmed.

This invention is an image printing apparatus including a main body for printing an image and a camera to be mounted on the main body, the main body comprising: a first input terminal for inputting a first image signal; a takeout instructing means for giving an instruction to take out a desired image signal; a takeout means for taking the desired image signal out of the first image signal in response to the takeout instruction; and a signal output means for outputting to the camera either one of the first image signal and the desired image signal; and the camera comprising: a monitor for displaying thereon an image corresponding to an image signal inputted from the main body; an operation control means for controlling operation of the camera in response to the operation instruction; and a first disabling means for disabling the operation instructing means based on the takeout instruction.

In this invention, the first image signal is inputted to the main body through the first input terminal. The takeout means, if given a takeout instruction by the takeout instructing means, takes a desired image signal out of the first image signal. Either one of the first image signal or the desired image signal is outputted to the camera. In the camera, displayed on the monitor is an image corresponding to the image signal inputted from the main body. The camera is controlled in operation responsive to an operation instruction by the operation instructing means. However, the operation instructing means is disabled by the disabling means when a takeout instruction is outputted by the takeout instructing means.

In one embodiment of this invention, when a print instruction is outputted from a print instructing means, a print means prints in accordance with the desired image signal in response to the print instruction. When the printing is ended, an enabling means enables the operation instructing means.

Where a second image signal is inputted through a second input terminal, a signal selecting means supplies selectively the first and second image signals to the takeout means. An input determining means determines on presence or absence of an input through the second input terminal, and the signal selecting means is controlled depending on the determining result by the input determining means. The takeout means takes the desired image signal out of an output of the signal selecting means.

Incidentally, the first input terminal is supplied with the photographic image signal outputted from the camera.

According to this invention, the disablement of the operation instructing means based on a takeout instruction renders the camera under printing ineffective in operation. It is therefore possible to print a desired image irrespective of erroneous operation.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIGS. 5a–c is a perspective view showing part of the FIG. 1 embodiment;

DETAILED DESCRIPTION OF THE PREFERRED EMBODIMENTS

Figure 1:
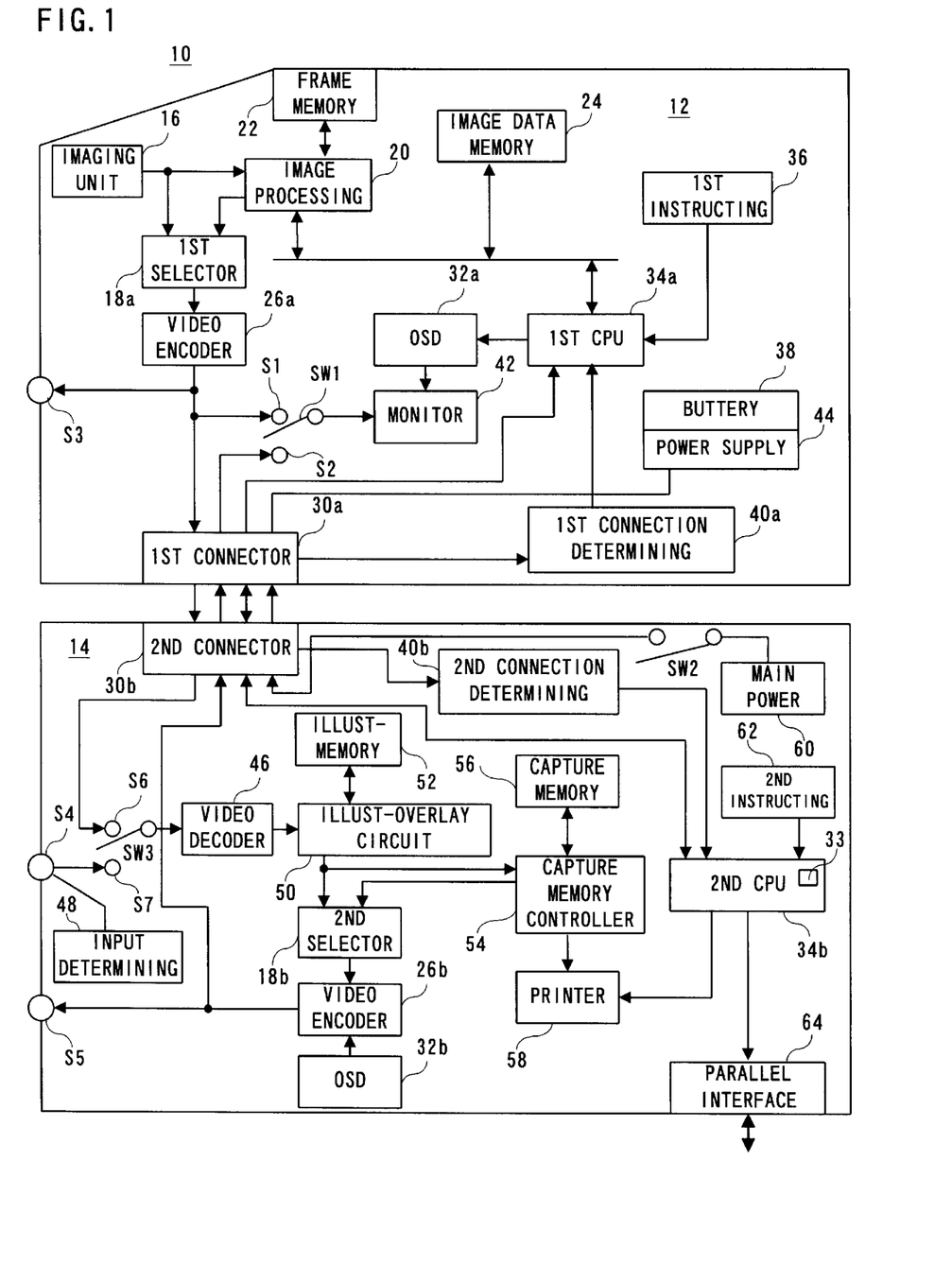
FIG. 1 is a block diagram showing one embodiment of this invention.

Referring to FIG. 1, an image printing apparatus 10 of this embodiment includes a digital camera 12 for photographing images and a main body 14 for printing the images. The digital camera 12 and the main body 14 are connectable with each other through a first connector 30a and a second connector 30b.

Figure 2:
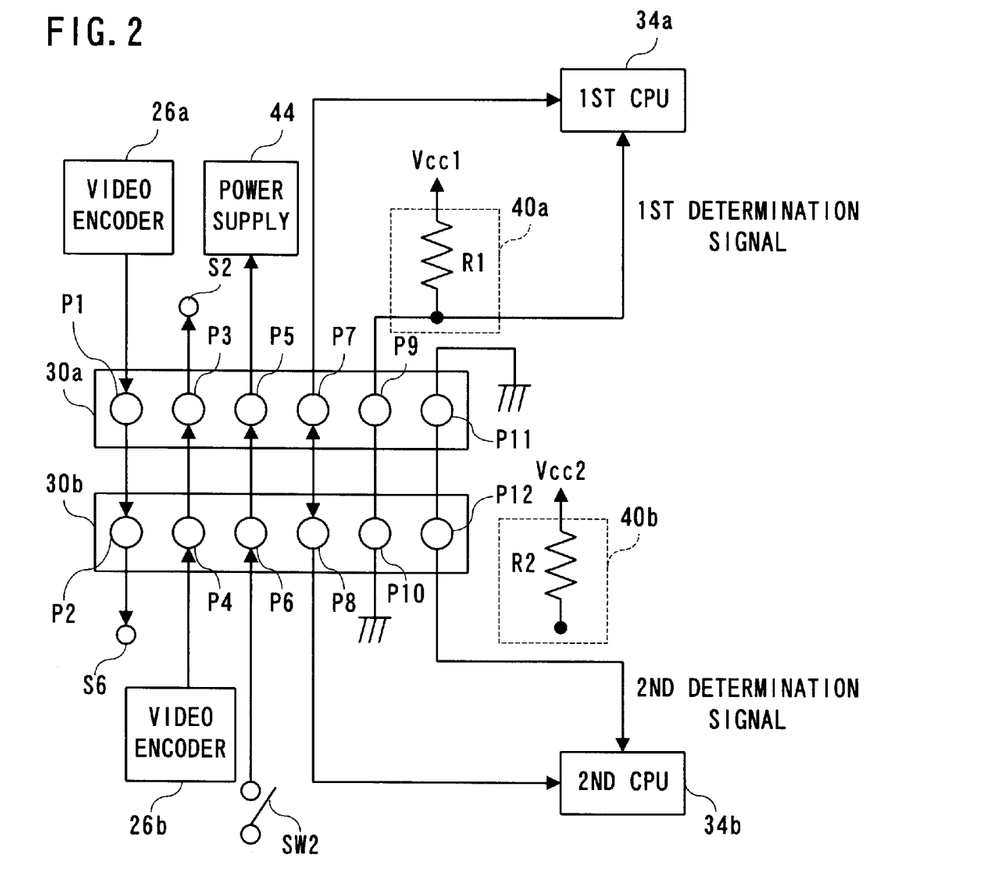
FIG. 2 is a block diagram showing one part of the FIG. 1 embodiment.

As shown in FIG. 2, ports P1 and P2 cooperatively connect between a video encoder 26a and a terminal S6. Ports P3 and P4 connect between a video encoder 26b and a terminal S2. Also, ports P5 and P6 connect between a power supply circuit 44 and one end of a switch SW2. Serial ports P7 and P8 connect between a first CPU 34a and a second CPU 34b. Further, ports P9 and P10 connect between a first connection determining circuit 40a and a ground, while ports P11 and P12 connect between a second connection determining circuit 40b and the ground. Incidentally, the first connection determining circuit 40a and the second connection determining circuit 40b, respectively, have outputs that are inputted to the first CPU 34a and the second CPU 34b.

Figure 5:
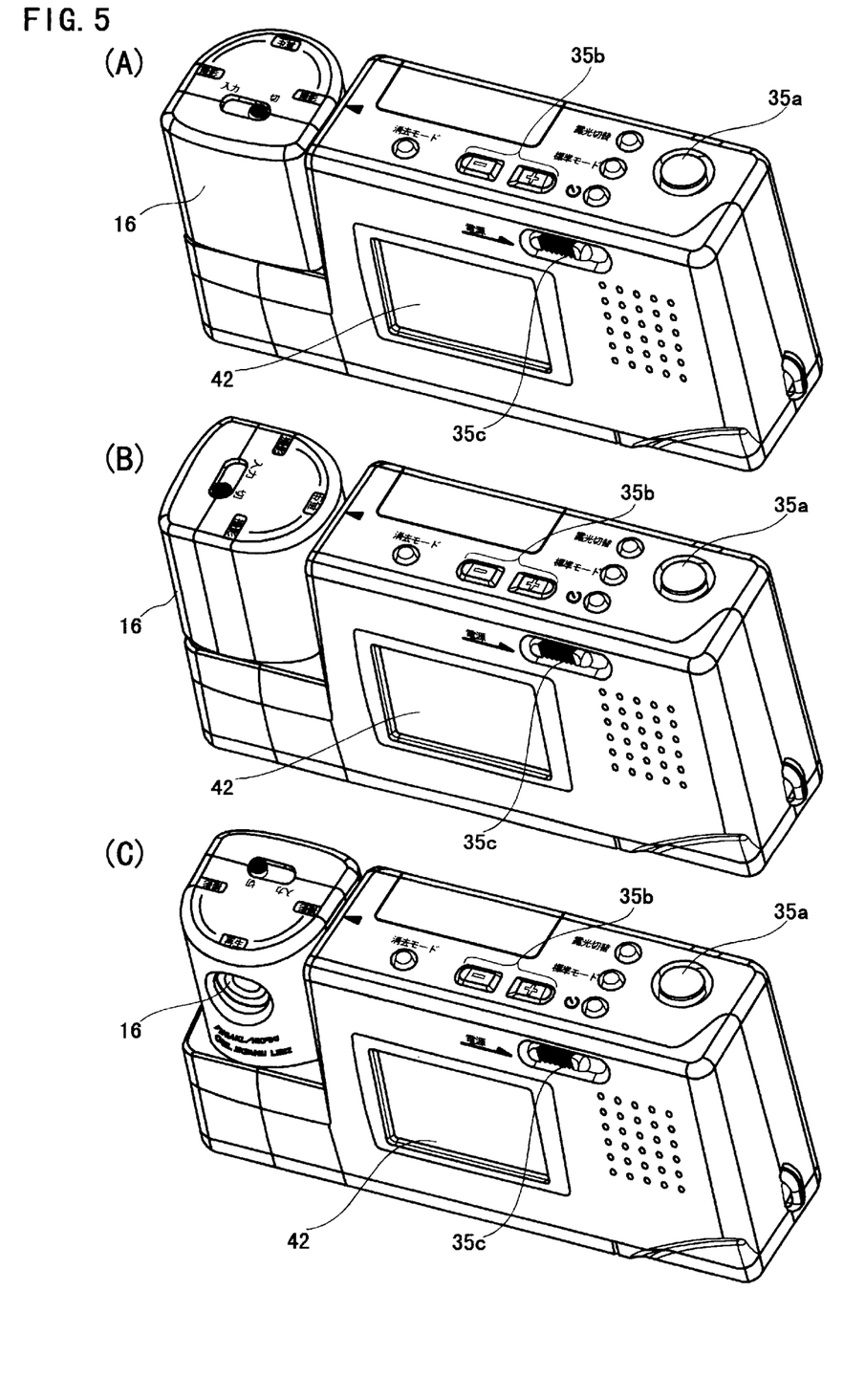

Referring to FIG. 5, the digital camera 12 is provided with an imaging unit 16 formed in a semi-cylindrical form. This imaging device 16 rotates through 180 degrees about lengthwise axis of the cylinder, as shown in FIGS. 5(A)–(C). When an optical lens 16a is directed frontward of the digital camera 12 as shown in FIG. 5(A), a first photographing mode is established. When the optical lens 16a is covered by the digital camera 12 as shown in FIG. 5(B), a reproducing mode is established. Further, when the operation lens 16a is directed rearward of the digital camera 12 as shown in FIG. 5(C), a second photographing mode is established. In both the first and second photographing modes, motion pictures are displayed in real time on a monitor 42. It is noted that, in the first photographing mode, motion pictures are displayed in a normal image state, while in the second photographing mode motion pictures are in a mirror image state, or a left-and-right reversed state. The reproducing mode is a mode to display a recorded still picture on the monitor 42.

If the imaging unit 16 is positioned in a direction as shown in FIG. 5(A) with the digital camera 12 detached from the main body 14, a first instructing circuit 36 shown in FIG. 1 establishes a first shoot mode to the first CPU 34a. The CPU 34a enables the imaging unit 16 to cause the first selector 18a to select an output of the imaging device 16, and connects a switch SW1 to a terminal S1. In response, the imaging unit 16 takes a picture of an object and outputs motion picture data (digital signal) corresponding thereto. The output motion picture data is supplied through the first selector 18a to the video encoder 26a. The video encoder 26a encodes the motion picture data thus inputted into a motion picture signal (composite image signal), and then outputs the motion picture signal to a monitor 42 through the switch SW1.

Figure 4:
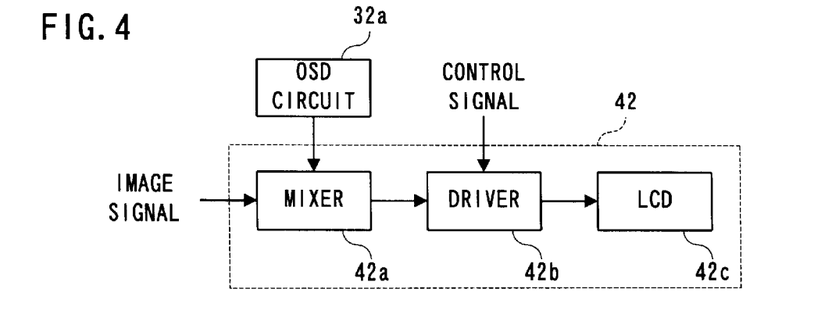
FIG. 4 is a block diagram showing still another part of the FIG. 1 embodiment.

The first CPU 34a also controls an OSD circuit 32a to output a character signal representative of shoot conditions such as light exposure to a mixer 42a shown in FIG. 4. The first CPU 34a also inputs a control signal for normal image representation to a driver 42b. The motion picture signal passed through the switch SW1 is mixed with the character signal by the mixer 42a, and the mixed signal is inputted to the driver 42b. The driver 42b drives the LCD 42c according to the inputted control signal and mixed signal. As a result, a motion picture superposed thereon with a character representative of a shoot condition is displayed as a normal image on the LCD 42c.

If the imaging unit 16 is directed as shown in FIG. 5(C), a second shoot mode is established in the first CPU 34a. The CPU 34a, in turn, outputs a character signal as a mirror image representative of a shoot condition to the OSD circuit 32a, and supplies a control signal for mirror image representation. Thus, the LCD 42 displays thereon a character as a normal image indicative of the shoot condition and a motion image as a mirror image.

In a first or second shoot mode, if the operator operates a shutter button 35a shown in FIG. 5, a first instructing circuit 36 supplies a shoot instruction to the first CPU 34a. The first CPU 34a instructs an image processing circuit 20 to process the 1-screen still image data outputted from the imaging unit 16. The image processing circuit 20 stores the still image data into a frame memory 22, and thereafter compresses it by a JPEG method. The obtained compressed image data is recorded in an image data memory 24 by the instruction of the CPU 34a.

If the operator moves the imaging device 16 to a direction shown in FIG. 5(B), the instructing circuit 36 establishes a reproducing mode in the first CPU 34a. The first CPU 34a, in turn, reads the compressed image data out of the image data memory 24, instructs the image processing circuit 20 to process the compressed image data thus readout, and causes the first selector 18a to select an output of the image processing circuit 20. The image processing circuit 20 decompresses the compressed image data by the JPEG method, and writes decompressed image data into the frame memory 22, thereafter reading out the decompressed image data therefrom.

The read-out decompressed image data, or reproduced image data, is inputted through the first selector 18a to the video encoder 26a where it is converted into a reproduced image signal. The reproduced image signal thus converted is inputted through the switch SW1 to the monitor 42. The first CPU 34a itself outputs a control signal for normal image representation, and causes the OSD circuit 32a to output a character signal for an image number. As a result, an image-numbered character and a reproduced image are displayed as normal images on the monitor 42. Incidentally, the reproduced image and the superposed image number are renewed by operating a renewal button 35b by the operator. In this manner, where the digital camera 12 is detached from the main body 14, the digital camera 12 operates in an individual manner.

If the digital camera 12 is mounted on the main body 14, the first connector 30a and the second connector 30b are brought into connection to each other. The first connection determining circuit 40a determines on presence or absence of connection of the first connector 30a, to thereby outputting a first determination signal. The second connection determining circuit 40b determines on presence or absence of connection of the second connector 30b, thereby outputting a second determination signal. As understood from FIG. 2, the first connection determining circuit 40a is formed by a resister R1 interposed between a power source Vcc 1 and the port P9, while the second connection determining circuit 40b is by a resistor R2 inserted between a power source Vcc 2 and the port P12. Consequently, the first determination signal and the second determination signal each assume a low level in a state of connection, and a high level in a state of disconnection. The first determination signal is supplied to the first CPU 34a, while the second determination signal to the second CPU 34b.

When the first determination signal is at a high level, the first CPU 34a connects the switch SW1 to a terminal S2, and disconnects a battery 38 from a power supply circuit 44. Also, when the second determination signal is at a high level, the second CPU 34b brings the switch SW2 into an on state. The turning on the switch SW2 supplies an output of a main power supply circuit 60, in place of that of the battery 38, to the power supply circuit 44. Incidentally, the main power supply circuit 60 converts a 100-V commercial alternating-current power into a direct-current power.

Figure 3:
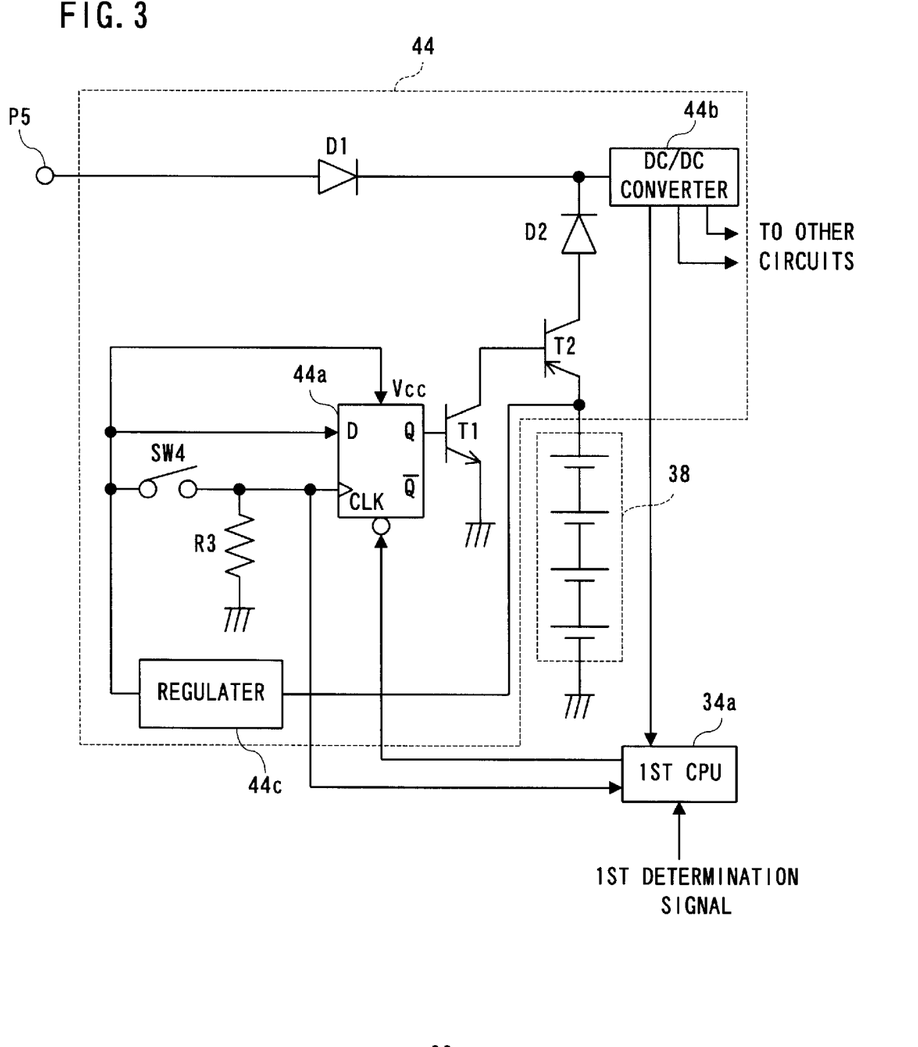
FIG. 3 is a block diagram showing another part of the FIG. 1 embodiment.

The power supply circuit 44 is concretely configured as shown in FIG. 3. The port P5 is connected with an anode of a diode D1, and a cathode of the diode D1 is connected to a DC/DC converter 44b and to a cathode of a diode D2. The diode D2 has an anode connected to an emitter of a transistor T2, while a collector of the transistor T2 is connected to a plus side of a battery 38. Incidentally, a minus side of the battery 38 is connected to the ground.

The transistor T2 has a base connected to a collector of a transistor T1 having an emitter connected to the ground, while the base of the transistor T1 is connected to a Q terminal of a D-FF circuit 44a. The battery 38 has a plus side connected through a regulator 44c to a power terminal and a D terminal of the D-FF circuit 44a as well as to one end of a switch SW4. The other end of the switch SW4 is connected to the ground through a resistor R3, and directly to a CLK terminal of the D-FF circuit 44a. The switch SW4 is interlocked with a power switch 35c of a non-locking type, as shown in FIG. 5. If the operator moves the power switch 35c toward the right, the switch SW4 is turned on. When the operator releases his finger from the power switch 35c, the power switch 35c returns to the left (initial position) and simultaneously the switch SW4 is turned off.

The first CPU 34a is driven by an output (drive voltage) of a DC/DC converter 44b. When the terminal voltage of the resistor R3 is varied from a positive-polarity predetermined voltage to a zero voltage or otherwise the first determination signal is changed from the high level to the low level, the first CPU 34a outputs a reset pulse to the D-FF circuit 44a. As a result, the output at the Q terminal is forcibly lowered.

In a state that the digital camera 12 is detached from the main body 14, if the power switch 35c is operated in order to start the digital camera 12, the switch SW4 is turned on and the input at a CLK terminal is raised up. Because a voltage of the battery 38 is always applied to the D terminal, the Q terminal has an output raised in response to a rise in the CLK terminal input. This causes the transistors T1 and T2 to be turned on so that the output of the battery 38 is supplied to the DC/DC converter 44b. As a result, the first CPU 34a is started by the battery 38.

If the power switch 35c is operated in a state that the digital camera 12 has been started, a variation in resistor R3 terminal voltage is detected by the first CPU 34a. The first CPU 34a supplies a reset pulse to the D-FF circuit 44a, thereby lowering the output level at the Q terminal. Turning off of the transistors T1 and T2 renders ineffective the supply of power by the battery 38, and the DC/DC converter 44b is suspended from outputting the drive voltage. As a result, the overall system including the first CPU 34a is turned off.

If the digital camera 12 is mounted onto the main body 14 with the digital camera 12 started, the first determination signal varies from the high level to a low level. At this time, the first CPU 34a also outputs a reset pulse with a result that the digital camera 12 is turned off. However, the first CPU 34a is promptly started because the switch SW2 shown in FIG. 1 is turned on and the DC-DC converter 44b is supplied with an output of the main power supply circuit 60. That is, the digital camera 12, when mounted on the main body 14, is driven based on commercially-available alternating current power supply.

An input determining circuit 48 determines on presence or absence of an input through an input terminal S4, and supplies a result of the determination to the second CPU 34b. The second CPU 34b controls a switch SW3 depending upon this determination result. That is, if the determination result is "WITH INPUT", the switch SW3 is connected to a terminal S7, while the determination result is "NO INPUT", the switch SW3 is connected to a terminal S6.

When the switch SW3 is connected to the terminal S6, the image signal outputted from the video encoder 26a is inputted to a video decoder 46 through the first connector 30a, the second connector 30b and the switch SW3. On the other hand, when the switch SW3 is connected to a terminal S7, an image signal inputted through an input terminal S4 is supplied to the video decoder 46 through the switch SW3. That is, if the input determination circuit 48 has a determination result of "WITH INPUT", the image signal inputted through the input terminal S4 has a priority to an image signal inputted from the digital camera 12.

In the video decoder 46, the image signal as an analog signal is converted into image data as a digital signal. The converted image data is supplied to a second selector 18b through an illust-overlay circuit 50. When illustration data is read out of an illust memory 52, the illust-overlay circuit 50 combines the image data with the illustration data. The second selector 18b normally selects the illust-overlay circuit 50. Accordingly, at the beginning of mounting the digital camera 12 on the main body 14, an output of the illust-overlay circuit 50 is applied to the video encoder 26b.

The second CPU 34b sends a request of mode information to the first CPU 34a through the serial ports P8 and P7. The second CPU 34b then recognizes which one of the first shoot mode, the second shoot mode and the reproducing mode is being set for the digital camera 12 according to sent-back mode information. The second CPU 34b causes the OSD circuit 32b to output a character signal depending upon the mode recognition. The OSD circuit 32b, when in the first shoot mode, outputs a "THROUGH IMAGE" character signal in a normal image state. In the second shoot mode, a "THROUGH IMAGE" character signal is outputted in a mirror image state. In the reproducing mode, a "PLAY" character signal is outputted in a normal image state. Incidentally, where there is an input through the input terminal S4, the OSD circuit 32b outputs an "EXTERNALLY INPUTTED IMAGE" character signal in a normal image state.

The video encoder 26b encodes the image data outputted through the second selector 18b into an image signal (composite image signal), and superposes a character signal outputted from the OSD circuit 32b over the image signal. Since in the digital camera 12 the switch SW1 is connected to the terminal S2, the image signal outputted from the video encoder 26b is inputted to the monitor 42 via the second connector 30b, the first connector 30a and the switch SW1. On the monitor 32, the character signal outputted from the OSD circuit 32a is also superposed over the image signal.

In the first shoot mode, therefore, displayed in normal image state are a character representative of a shoot condition, a character ("THROUGH IMAGE") representative of attributes of the image, and a real-time motion image. In the second shoot mode, a character representative of a shoot condition and a character "THROUGH IMAGE") representative of image attributes are displayed in a normal image state, and a real-time motion image is displayed in a mirror image state. In the reproducing mode, displays are made in a normal image state for a character representative of an image number, a character ("PLAY") representative of image attributes and a reproduced image are displayed in a normal image state. If there is an input through the input terminal S4, a character ("EXTERNALLY INPUTTED IMAGE") representative of image attributes and externally inputted image are displayed in a normal image state.

Incidentally, the first CPU 34a complies with an instruction by the first designating circuit 36 unless a control priority command is transmitted from the second CPU 34b. That is, if there is no control priority command, the first CPU 34a enters into any of the second shoot mode and the reproducing mode in compliance with the instruction by the first instructing circuit 36, and controls the OSD circuit 32a and the driver 42b shown in FIG. 4 according to a mode thus entered.

Figure 6:
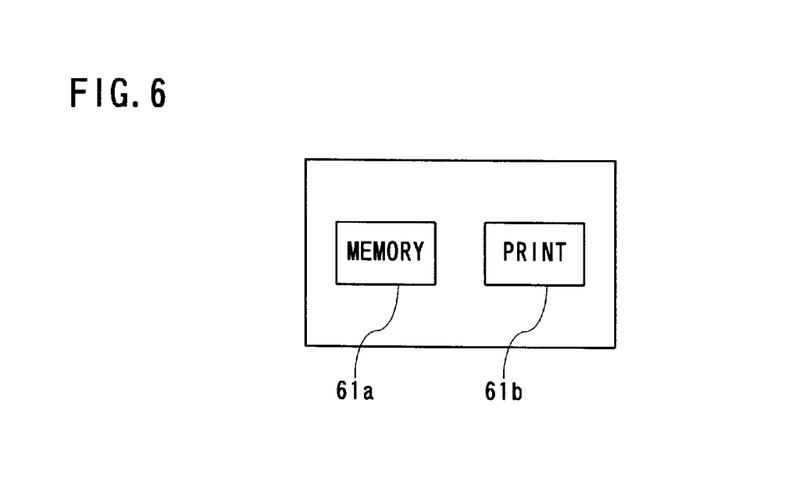
FIG. 6 is an illustrative view showing one part of the FIG. 1 embodiment.

The main body 14 is provided with a memory button 61a and a print button 61b as shown in FIG. 6. If the operator manipulates the memory button 61a, the second CPU 34b enables a capture memory controller 54. The capture memory controller 54 fetches one screen of still image data outputted from the illust-overlay circuit 50 to write the same data into a capture memory 56. The second CPU 34 or second selector 18b is caused to select an output of the capture memory controller 54.

The capture memory controller 54 reads the still image data out of the capture memory 56, and supplies it to the video encoder 26b through the second selector 18b. On the other hand, the OSD circuit 32b outputs a "MEMORY IMAGE" character signal in a normal image state. The still image data is encoded by the video encoder 26b. The encoded still image signal is outputted, together with a "MEMORY IMAGE" character signal outputted from the OSD circuit 32b, to the digital camera 12.

The second CPU 34b also supplies a control priority command to the first CPU 34a through the serial ports P8 and P7. In response, the first CPU 34a disables the first instructing circuit 36 and the OSD circuit 32a, thereby canceling the mirror image representation on images.

As a result, normally displayed on the monitor is an image corresponding to the still image data fetched by the capture memory 56. If the mode before operating the memory button 61a is the first or second shoot mode, the motion image in normal or mirror representation is switched, simultaneously with the operation of the memory button 61a, to a still image in normal image representation. Incidentally, because the first instructing circuit 36 is disabled in response to the operation of the memory button 61a, there is no change in the display on the monitor 42 even if the imaging unit 16 is rotated or the shutter button 35a is manipulated.

If a print button 61b is operated at this time, the capture memory controller 54 also supplies the still image data read out of the capture memory 56 to a printer 58. As a result, the printer 58 prints a same image as the image being displayed on the monitor 42. If the printing is completed, the second CPU 34b permits the first CPU 34a to normally operate. Due to this, the first CPU 34a enables the first instructing circuit 36 and enters into a mode corresponding to an output of the first instructing circuit 36. If the output of the first instructing circuit 36 is an instruction to set a second shoot mode, the display on the monitor 42 is changed from a normally-represented still image to a mirror-represented motion image.

Incidentally, since the OSD circuit 32b is not interposed between the capture memory controller 54 and the printer 58, there is no possibility of printing characters. The printer 58 may employ a thermal printer, an ink jet printer, etc.

Such an operation is also made upon setting the reproducing mode or inputting an image signal through the input terminal S4.

More specifically, in the reproducing mode the reproduced image is renewed in accordance with operation of the renewal button 35c. When a desired reproduced image is being displayed on the monitor 42, if the memory button 61a is operated, the corresponding reproduced image data is written into the capture memory 56 with the same reproduced image displayed on the monitor 42. Accordingly, there is no change of display on the monitor 42 except in that the character "PLAY" is turned into "MEMORY IMAGE". If a print button 62b is operated, a same image as the reproduced image displayed on the monitor 42 is printed by the printer 58. When the printing is completed, the first instructing circuit 36 is enabled to thereby set a reproducing mode again.

When an image signal is inputted through the input terminal S4, an image corresponding to the inputted image signal is displayed on the monitor 42. At this time, if the memory button 61a is manipulated, the image data inputted at the time of the operation is written into the capture memory 56 and a corresponding image is displayed on the monitor 42. If the print button 62b is operated, an image same as that on display is printed. If the printing is completed, an image signal inputted through the input terminal S4 is again outputted on the monitor 42.

Incidentally, the image signal encoded by the video encoder 26a, 26b is also outputted to the outside through the terminal S3, S5. Also, various data including image data are transmitted to and received from, for example, an external personal computer through a parallel interface 64.

Figure 7:
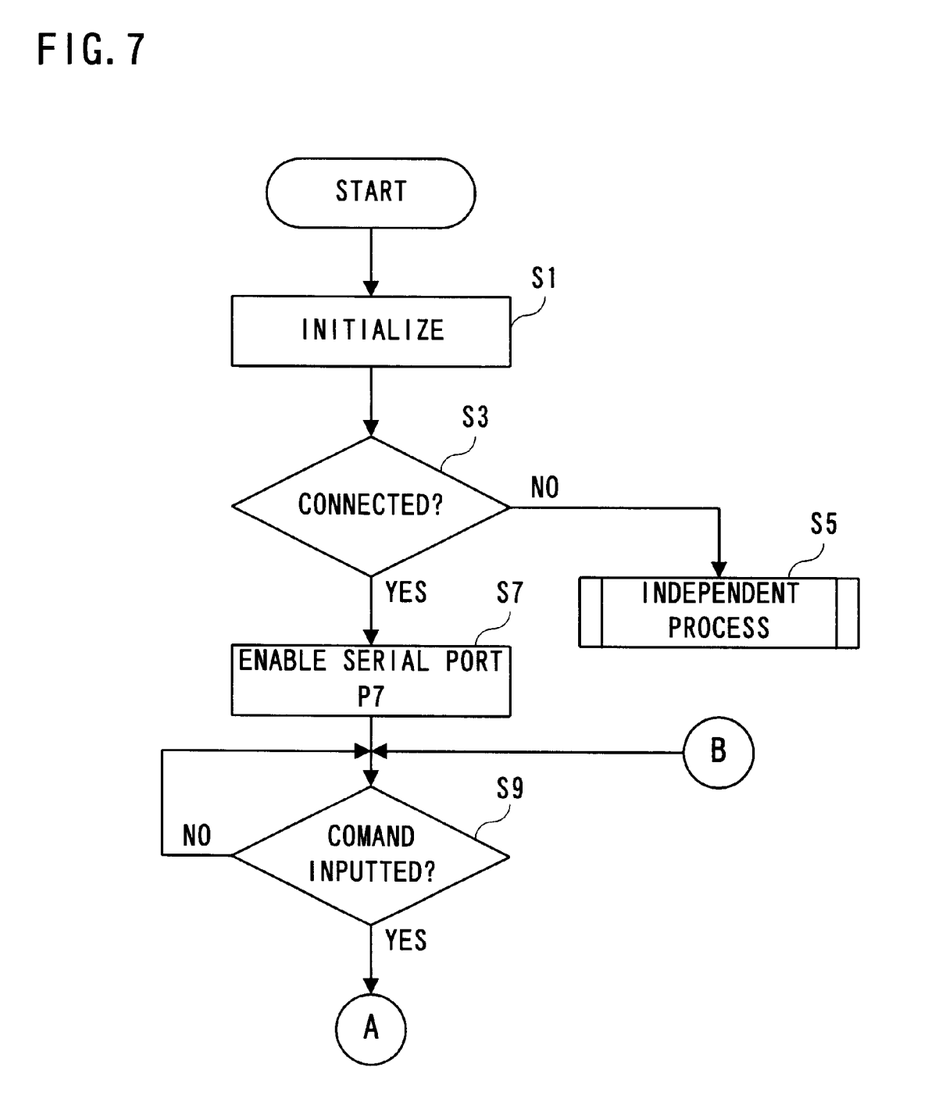
FIG. 7 is a flowchart showing pat of operation of the FIG. 1 embodiment.
Figure 8:
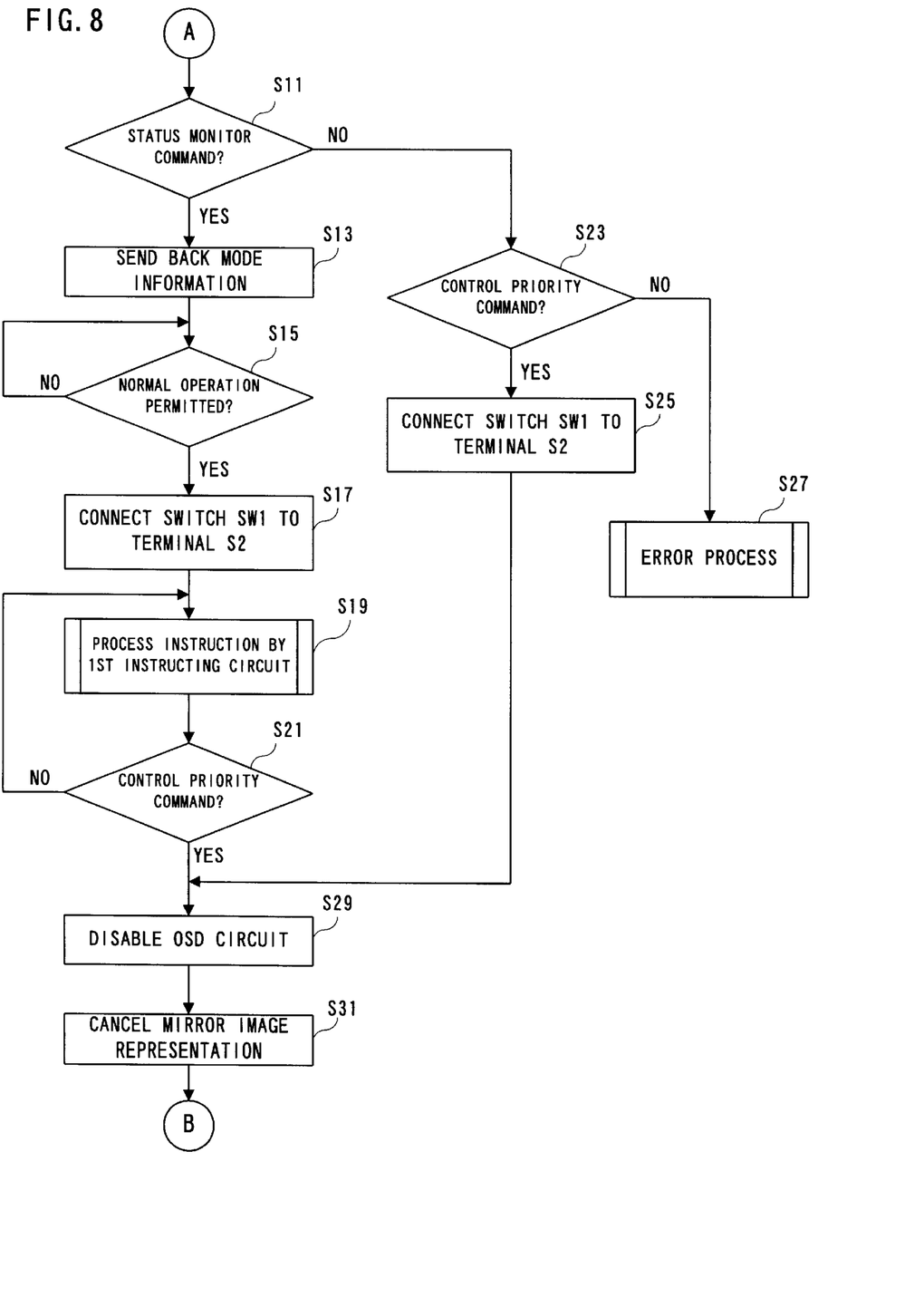
FIG. 8 is a flowchart showing another part of the operation of the FIG. 1 embodiment.
Figure 9:
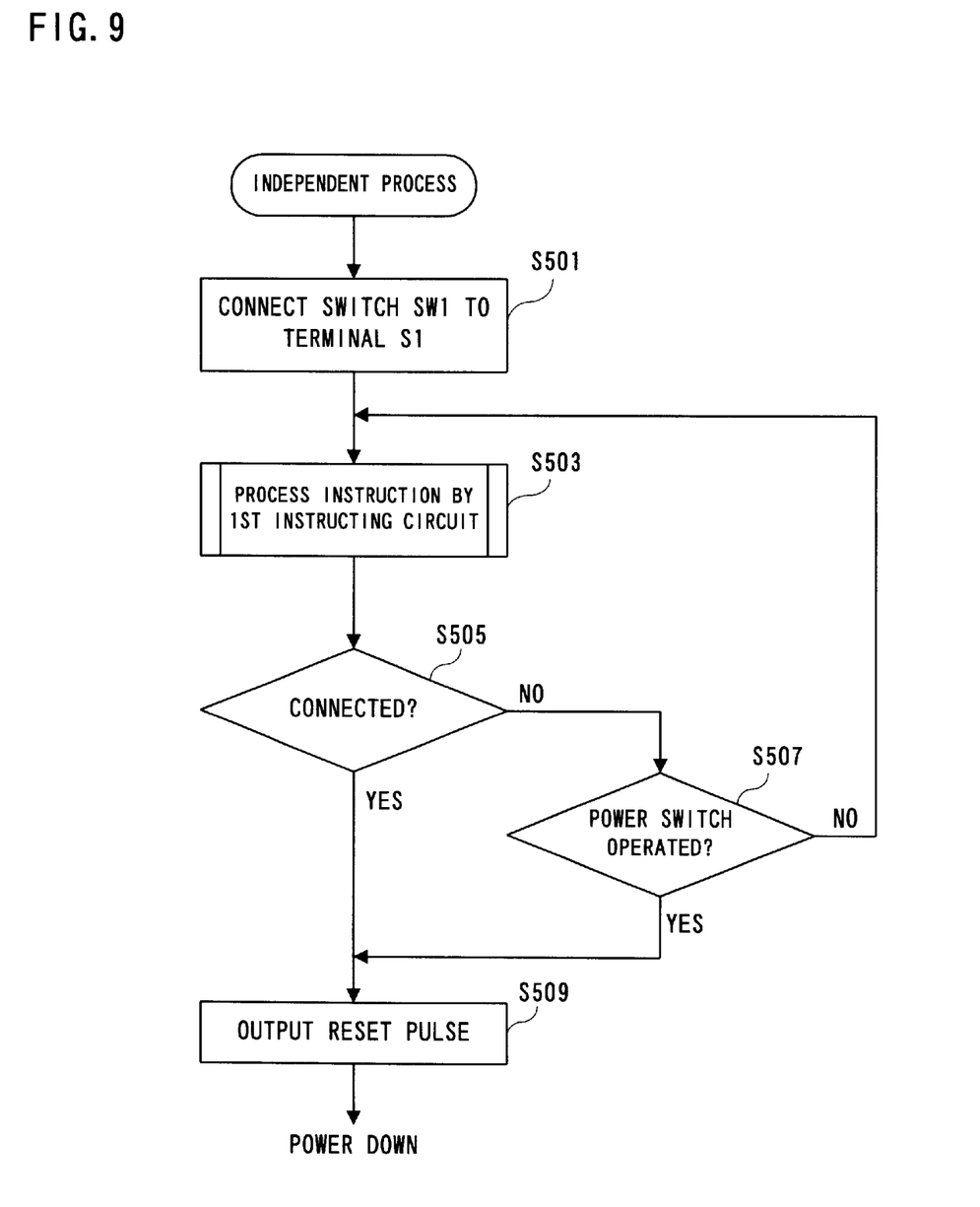
FIG. 9 is a flowchart showing still another part of the operation in the FIG. 1 embodiment.
Figure 10:
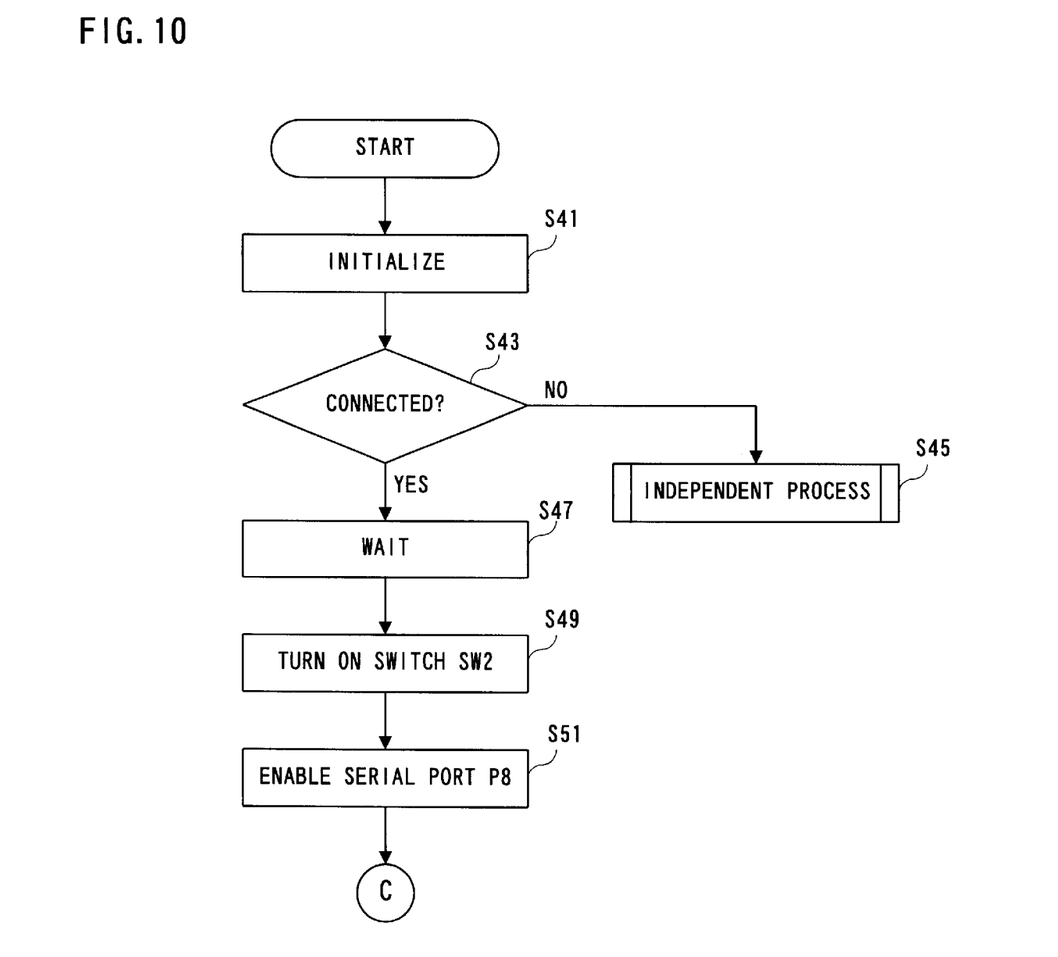
FIG. 10 is a flowchart showing another part of the operation of the FIG. 1 embodiment.
Figure 11:
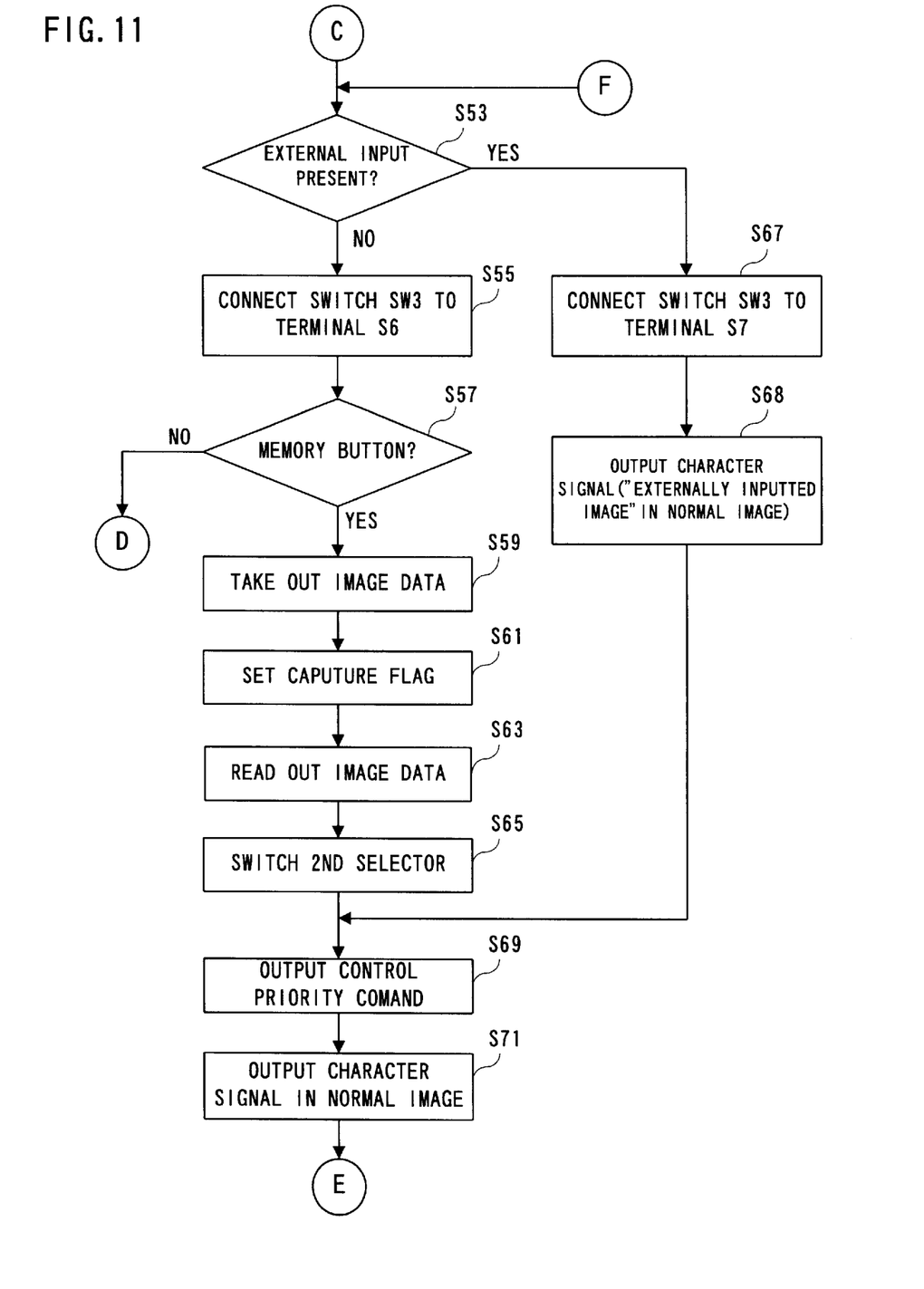
FIG. 11 is a flowchart showing another part of the operation of the FIG. 1 embodiment.
Figure 12:
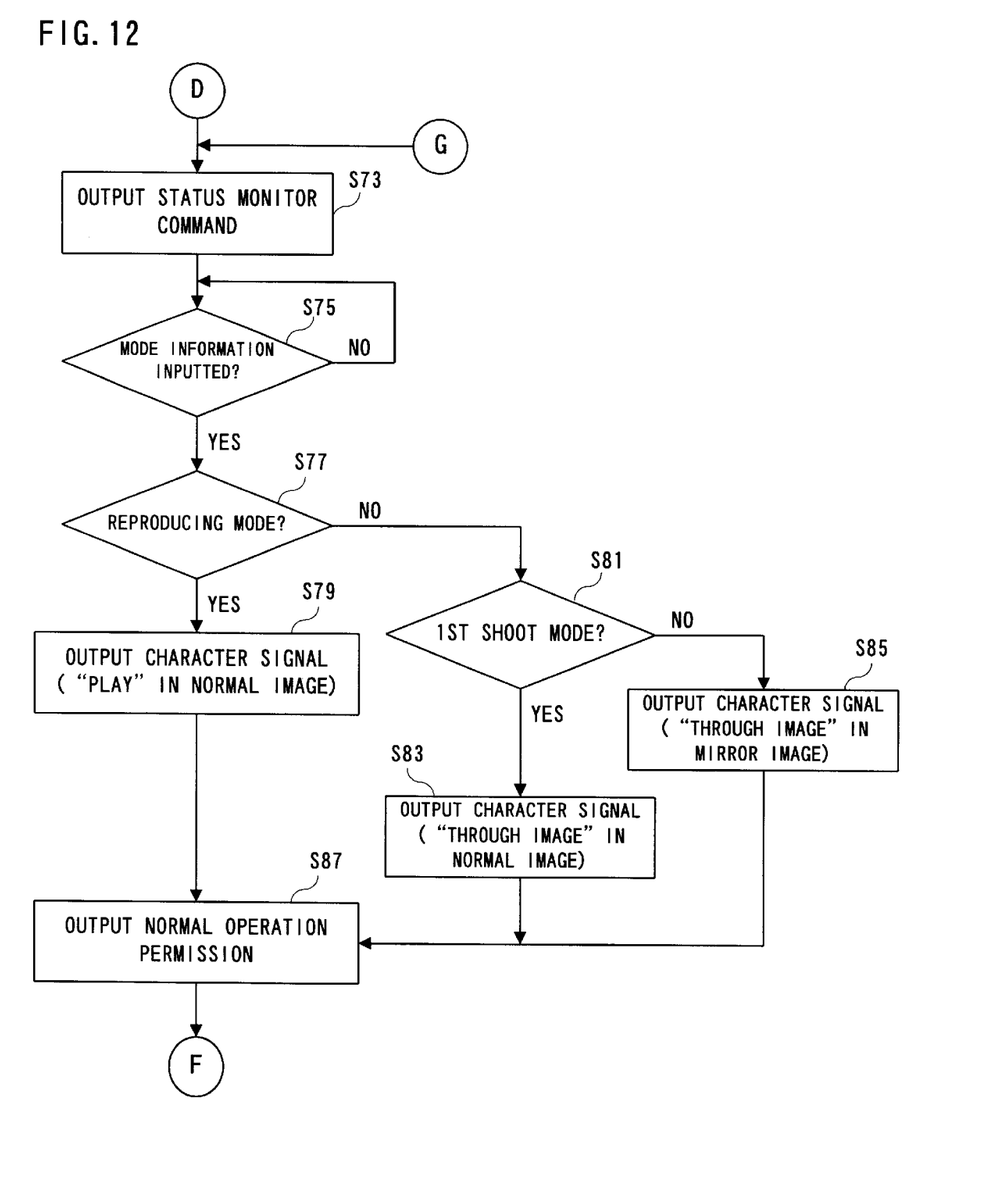
FIG. 12 is a flowchart showing further part of the operation of the FIG. 1 embodiment.
Figure 13:
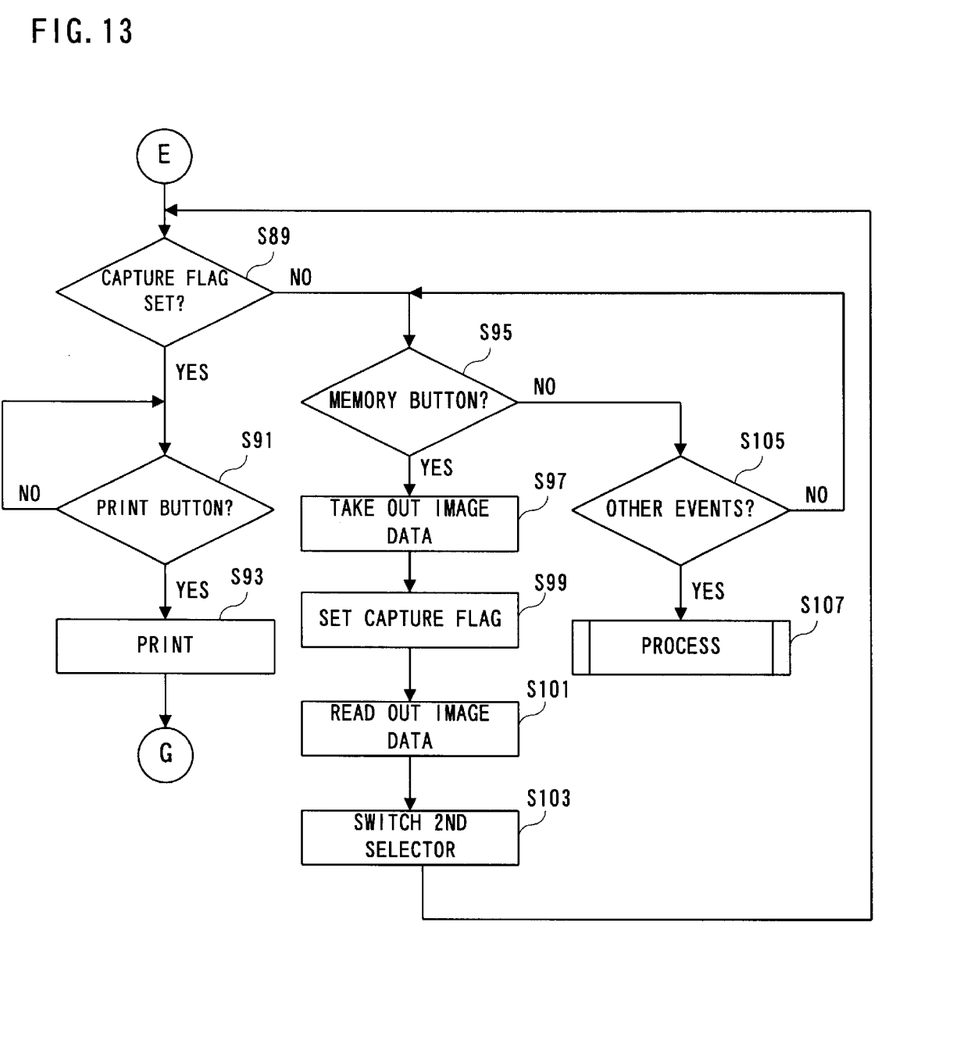
FIG. 13 is a flowchart showing yet another part of the operation of the FIG. 1 embodiment.

The first CPU 34a performs a main routine shown in FIG. 7 and FIG. 8 and a subroutine shown in FIG. 9. The processing is started upon turning on the power. First, at a step S1 setting is initialized. Next, at a step S3, a first determination signal is fetched to determine whether the first connector is connected with the second connector 30b or not. If the first determining signal is at a high level, "NO" is determined and an independent process is executed at a step S5. That is, at a step S501 shown in FIG. 9 the switch SW1 is connected to the terminal S1, and at a step S503 an instruction by the first instructing circuit 36 is processed. Thereafter, it is determined at a step S505 whether the first connector 30a is connected with the second connector 30b or not, and at a step S507 it is determined whether the power switch 35c is operated or not. If the both are "NO", the process returns to the step S503 to process the instruction by the first instructing circuit 36. However, if any one is "YES", the process proceeds to a step S509 to output a reset pulse to the power supply circuit 44. As a result of supplying the reset pulse to the power supply 44, the transistor T1 is turned off and power supply is shut down.

Referring back to FIG. 7, if "YES" at the step S3, the serial port P7 is enabled at a step S7. That is, where a command is outputted from the second CPU 34b, the command is supplied to the first CPU 34a through the serial ports P8 and P7 shown in FIG. 2. Accordingly, the serial port P7 on the digital camera 12 side is enabled at the step S7. Then, it is determined at a step S9 whether there is a command input from the second CPU 34b or not. If "NO", the process of the step S9 is repeated, while if "YES", the content of the command is discriminated at the steps S11 and S23.

If the inputted command is a status monitor command, "YES" is determined at the step S11 and then, at a step S13, mode information, i.e., information representative of a current mode of the digital camera 12, is sent back to the second CPU 34b. If the given command is a control priority command, "YES" is determined at the step S23 and then, at a step S25, the switch SW1 is connected to the terminal S2. Then, the process advances to a step S29. If the given command is neither a status monitor command nor a control priority command, an error process is executed at a step S27.

At a step S15, it is determined whether or not a normal operation permission is given by the second CPU 34b. If "YES", the switch SW1 is connected to the terminal S2 at a step S17, and at a step S19 the instruction by the first instructing circuit 36 is processed. That is, if the first shoot mode is established, a real-time motion image is displayed as a normal image on the monitor 42, while if the second shoot mode is established, a real-time motion image is displayed as a mirror image on the monitor 42. If the shutter button 35a is operated during either the first shoot mode or the second shoot mode, the photographic image data is recorded in the image data memory 24. If the reproducing mode is set, the image data is reproduced from the image data memory 24 and the reproduced image is displayed on the monitor 42. It should be noted that, because the switch SW1 is connected to the terminal S2, the image signal outputted from the video encoder 26a is once outputted to the main body 14. The image signal returned from the main body is supplied through the switch SW1 to the monitor 42.

At a step S21 it is determined whether a control priority command is supplied from the second CPU 34b or not. If "NO" here, the process returns to the step S19. Accordingly, the instruction by the first instructing circuit 36 is kept effective unless a control priority command comes. If a control priority command is supplied, "YES" is determined at the step S21 to disable the OSD circuit 32a at a step S29, and then the mirror image display is cancelled at a step S31. Then the process returns to the step S9. As a result, the instruction by the first instructing circuit 36 is kept ineffective until a status monitor command and a normal operation permission are again given by the second CPU 34b.

The second CPU 34b performs processing of a main routine shown in FIG. 10 to FIG. 13. The process is started upon turning on the power. First, at a step S41 setting is initialized. Next, at a step S43 a second determination signal is fetched to determine whether the second connector 30b is connected with the first connector 30a or not. If the second determination signal is at a high level, "NO" is determined at the step S43 and, at a step S45, an independent process is executed. On the other hand, if the second determination signal is at a low level, "YES" is determined at the step S43 and a step S47 is executed to wait for a predetermined time. That is, the waiting is continued until the digital camera 12 is completely turned off by a process of the step S509 in FIG. 9.

Then, the switch SW2 is turned on at a step S49 to supply the digital camera 12 with a direct-current power based on a commercial alternating-current power. As a result, the digital camera 12 is restarted. At a step S51 the serial port P8 shown in FIG. 2 is enabled. Since the serial port P7 is enabled by the first CPU 34a, transmission and reception of commands or mode information are enabled between the first CPU 34a and the second CPU 34b.

At a step S53 it is determined based on a result of the determination by the input determining circuit 48 whether there is an input through the input terminal S4 or not. If "YES" here, the switch SW3 is connected to the terminal S7 at a step S67 and, at a step S68, the OSD circuit 32b is caused to output a character signal "EXTERNALLY INPUTTED IMAGE" in a normal image state. Then, the process advances to a step S69.

On the other hand, if "NO" at the step S53, the switch SW3 is connected to the terminal S6 at a step S55, and then it is determined at a step S57 whether the memory button 61a shown in FIG. 6 is depressed or not. If the memory button 61a is not depressed, a status monitor command is outputted to the first CPU 34a at a step S73, and then it is determined at a step S75 whether mode information is sent back from the first CPU 34a or not. If there is sending-back of mode information, "YES" is determined at the step S75 and then, at steps S77 and S81, determination is made as to a current mode of the digital camera 12.

If the current mode is the reproducing mode, "YES" is determined at a step S77 and then, at a step S79, the OSD circuit 32b is caused to output a character signal "PLAY" in a normal image state. On the other hand, if in the first shoot mode, "YES" is determined at a step S81 and the OSD circuit 32b is caused to output a character signal "THROUGH IMAGE" in a normal image state. If in the second shoot mode, "NO" is determined at a step S81 and then, at a step S85, the OSD circuit 32b is caused to output a character signal "THROUGH IMAGE " in a mirror image state. After ending the processes of the steps S79, S83 or S85, a normal operation permission is outputted to the first CPU 34a and the process returns to the step S53.

As a result, unless there is input through the input terminal S4 and the memory button 61a is depressed, an image according to the mode of the digital camera 12 is kept in display on the monitor 42.

If it is determined at the step S57 that the memory button 61a is depressed, an instruction is made at a step S59 to the capture memory controller 54 to take out the image data. In response, the capture memory controller 54 takes one screen of still image data out of an output of the illust-overlay circuit 50 and write the takeout data into the capture memory 56. The second CPU 34b subsequently sets at a step S61 a capture flag 33, and, at a step S63, causes the capture memory controller 54 to read still image data out of the capture memory and further, at a step S65, the second selector 18b to select an output of the capture memory controller. Due to this, still image data corresponding to the image being displayed on the monitor 42 at a time that the memory button 61a is operated is written into the capture memory 56, which data is continuously outputted through the second selector 18b.

The second CPU 34b thereafter outputs at a step S69 a control priority command to the first CPU 34a, and then causes the OSD circuit 32b to output a character signal in a normal image state at a step S71. That is, the output of the control priority command cancels the mirror image display at the step S31, and all the character signals outputted from the OSD circuit 32b are returned to normal images at the step S71. It is then determined at a step S89 whether the capture flag 33 is set or not. When the process proceeds from the step S53 to the step S69 through the steps S67 and S68, no image data has been taken out. Accordingly, the capture flag 33 is determined of state at the step S89 in order to effect processes differently between the cases of the flag is set and reset.

If "YES" at the step S89, it is determined at a step S91 whether the print button 61b is depressed or not. If "NO", the process of the step S91 is repeated, while if "YES", the printer 58 is enabled at a step S93 to perform printing on the image data read out of the capture memory 56. As a result, a same image as that being displayed on the monitor 42 is printed. After the printing is ended, the process returns to the step S73.

If "NO" at the step S89, it is then determined at a step S95 whether the memory button 61a is depressed. If "YES" here, the similar processes to those of the steps S59–S65 are executed at steps S97–S103, and the process returns to the step S89. As a result, externally inputted image data is also written into the capture memory 56 in accordance with operation of the memory button 61a while the corresponding image is displayed on the monitor 42. Depending upon operation of the print button 61b, a same image as that being displayed on the monitor 42 is printed.

Incidentally, if "NO" at the step S95, it is determined at a step S105 whether other events have occurred or not. If "YES" here, such events are processed at a step S107, while, if "NO", the process returns to the step S95. The other events involve menu button (not shown) operation, illust-overlay button (not shown) operation, etc. The determination on the other events may be performed when "NO" is determined at the step S57.

According to this embodiment, the image signal supplied from the digital camera 12 to the main body 14 is taken out depending upon operation of the memory button 61a. The takeout image is outputted on the monitor 42 and printed by operation of a print button 61b. Accordingly, the image to be printed can be readily confirmed without a necessity of separately preparing a monitor unit such as a television receiver. Also, since the first designating circuit 36 is disabled after operating the memory button 61a, it is possible to prevent an unwanted image from being printed due to erroneous operations of the digital camera 12 during print operation.

Incidentally, in this embodiment 1-screen still image data was taken out by operating the memory button in any of the modes being established. Alternatively, a particular portion may be taken out of 1-screen still image data at a time that the memory button is operated. Also, the digital camera of this embodiment reproduced a still image, a motion image can be reproduced if it is adapted to record motion images. Further, the image signal to be externally inputted may be either a still image signal or a motion image signal.

Further, when the digital camera is mounted on the main body, still image signals reproduced from the memory stored due to past photographing are supplied from the digital camera to the main body, besides motion image signal being photographed in real time. The respective signals may be defined as shoot image signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image printing apparatus having a main body for printing an image and a camera to be mounted on said main body,
   said camera comprising: a signal supply means for supplying a photographic image signal to said main body; and a monitor for displaying thereon an image corresponding to the image signal inputted from said main body; and
   said main body comprising: a takeout means for taking a desired image signal out of the photographic image signal in response to a takeout instruction; a first output means for outputting the desired image signal to said camera; and a print means for printing in accordance with the desired image signal, wherein said monitor displays an image corresponding to the desired image signal outputted from said first output means so that an image printed by said print means can be confirmed on a screen.

2. An image printing apparatus according to claim 1, wherein
   the photographic image signal is either one of a real time image signal due to photographing or an image signal reproduced from a recording medium.

3. An image printing apparatus according to claim 1, wherein
   said main body further comprises a memory for storing the desired image signal, wherein
      said takeout means includes a writing means for writing the desired image signal into said memory, and
      said first output means including a read-out means for reading the desired image signal from said memory.

4. An image printing apparatus according to claim 3, wherein
   said main body further comprises a printing instructing means for giving an instruction to print in accordance with the desired image signal, wherein
      said print means performs printing, in response to the print instruction, the desired image signal read out of said memory.

5. An image printing apparatus having a main body for printing an image and a camera to be mounted on said main body,
   said camera comprising: a signal supply means for supplying a photographic image signal to said main body; and a monitor for displaying thereon an image corresponding to the image signal inputted from said main body; and
   said main body comprising: a takeout means for taking a desired image signal out of the photographic image signal; a first output means for outputting the desired image signal to said camera; and a print means for printing in accordance with the desired image signal; wherein
      said main body further comprises a takeout instructing means for giving an instruction to take out the desired image signal, and a memory for storing the desired image signal, wherein
         said takeout means includes a means for writing the desired image signal into said memory in response to the takeout instruction, and
         said first output means including a read-out means for reading the desired image signal from said memory; and wherein
            said main body further comprises a second output means for outputting the photographic image signal as it is to said camera, an output selecting means for selecting either one of said first output means and said second output means, and an output selection control means for controlling said output selecting means depending upon the takeout instruction.

6. An image printing apparatus according to claim 4, wherein
   said camera further comprises an operation instructing means for giving an instruction for various operations, an operation control means for controlling operations of said camera in response to the operation instruction, a first disabling means for disabling said operation instructing means depending upon the takeout instruction, and an enabling means for enabling the operation instructing means after ending the printing in accordance with the desired image signal.

7. An image printing apparatus having a main body for printing an image and a camera to be mounted on said main body,
   said camera comprising: a signal supply means for supplying a photographic image signal to said main body; and a monitor for displaying thereon an image corresponding to the image signal inputted from said main body; and
   said main body comprising: a takeout means for taking a desired image signal out of the photographic image signal; a first output means for outputting the desired image signal to said camera; and a print means for printing in accordance with the desired image signal; wherein
      said main body further comprises a takeout instructing means for giving an instruction to take out the desired image signal, and a memory for storing the desired image signal, wherein
         said takeout means includes a means for writing the desired image signal into said memory in response to the takeout instruction, and
         said first output means including a read-out means for reading the desired image signal from said memory; and wherein
            said main body further comprises a printing instructing means for giving an instruction to print in accordance with the desired image signal, wherein
               said print means performs printing, in response to the print instruction, the desired image signal read out of said memory; wherein
               said camera further comprises an operation instructing means for giving an instruction for various operations, an operation control means for controlling operations of said camera in response to the operation instruction, a first disabling means for disabling said operation instructing means depending upon the takeout instruction, and an enabling means for enabling the operation instructing means after ending the printing in accordance with the desired image signal; and wherein
               said main body further comprises an externally inputting terminal, a signal selecting means for selecting either one of the photographic image signal and an input image signal inputted through said externally inputting terminal, an input determining means for determining presence or absence of an input through said externally inputting terminal, and a signal selection control means for controlling the signal selecting means depending upon an input determining result by said input determining means, wherein said takeout means takes the desired image signal out of an output of said signal selecting means.

8. An image printing apparatus according to claim 7, wherein said camera further comprises a second disabling means for disabling said operation control means based on an input determining result representative of a presence of an input.

9. An image printing apparatus according to claim 8, wherein said camera further comprises a mirror image display means for displaying an image in a mirror image state, and a mirror image display releasing means for releasing mirror display based on either one of the takeout instruction and the input determining result representative of presence of an input.

10. An image printing apparatus having a main body for printing an image and a camera to be mounted on said main body, said camera comprising: a signal supply means for supplying a photographic image signal to said main body; and a monitor for displaying thereon an image corresponding to the image signal inputted from said main body; and said main body comprising: a takeout means for taking a desired image signal out of the photographic image signal; a first output means for outputting the desired image signal to said camera; and a print means for printing in accordance with the desired image signal; wherein said camera further comprises a first connecting member for connection to said main body, a first connection determining means for determining presence or absence of connection to said main body, a direct-current power supply for generating a first direct-current voltage, an invalidating means for invalidating said direct-current power supply depending upon a first determining result by said first connection determining means, and a drive voltage creating means for creating a drive voltage to said camera based on an inputted direct-current voltage, and said main body further comprising a second connecting member for connection to said camera, a second connection determining means for determining presence or absence of connection to said camera, a direct-current voltage creating means for creating a second direct-current voltage, and a voltage supply means for supplying the second direct-current voltage to said camera depending upon a second determining result by said second connection determining means.

11. An image printing apparatus including a main body for printing an image and a camera to be mounted on said main body, said main body comprising: a first input terminal for inputting a first image signal; a takeout instructing means for giving an instruction to take out a desired image signal; a takeout means for taking the desired image signal out of the first image signal in response to the takeout instruction; and a signal output means for outputting to said camera either one of the first image signal and the desired image signal; and said camera comprising: a monitor for displaying thereon an image corresponding to an image signal inputted from said main body; an operation control means for controlling operation of said camera in response to the operation instruction; and a first disabling means for disabling said operation instructing means based on the takeout instruction.

12. An image printing apparatus according to claim 11, wherein said camera further comprises a signal supply means for supplying an photographic image signal to said main body through said first input terminal.

13. An image printing apparatus according to claim 11, wherein said main body further comprises a print instructing means for giving an instruction to print in accordance with the desired image signal, and a printing means for performing printing with the desired image signal, and said camera further comprising an enabling means for enabling said operation instructing means after ending the printing.

14. An image printing apparatus including a main body for printing an image and a camera to be mounted on said main body;

said main body comprising: a first input terminal for inputting a first image signal; a takeout instructing means for giving an instruction to take out a desired image signal; a takeout means for taking the desired image signal out of the first image signal in response to the takeout instruction; and a signal output means for outputting to said camera either one of the first image signal and the desired image signal; and said camera comprising: a monitor for displaying thereon an image corresponding to an image signal inputted from said main body; an operation control means for controlling operation of said camera in response to the operation instruction; and a first disabling means for disabling said operation instructing means based on the takeout instruction; wherein said main body further comprises a print instructing means for giving an instruction to print in accordance with the desired image signal, and a printing means for performing printing with the desired image signal, and said camera further comprising an enabling means for enabling said operation instructing means after ending the printing, wherein said main body further comprises a second input terminal for inputting a second image signal, a signal selecting means for selectively supplying the first image signal and the second image signal to said takeout means, an input determining means for determining presence or absence of an input through said second input terminal, and a selection control means for controlling said signal selecting means depending upon an input determining result by said input determining means, wherein said takeout means takes the desired image signal out of an output of said signal selecting means.

15. An image printing apparatus according to claim 14, wherein said camera further comprises a second disabling means for disabling said operation instructing means based on an input determining result representative of presence of an input.

* * * * *